United States Patent [19]

Riboulet et al.

[11] 4,122,239
[45] Oct. 24, 1978

[54] SOLAR ABSORBERS WITH LAYERS OF NICKEL/CHROMIUM ALLOY AND DIELECTRIC MATERIAL

[75] Inventors: Michel Jean Riboulet, Calmont; Jacques Yves Louis Georges Simon, Toulouse, both of France

[73] Assignee: Centre National d'Etudes Spatiales, Paris, France

[21] Appl. No.: 758,753

[22] Filed: Jan. 12, 1977

[30] Foreign Application Priority Data

Jan. 19, 1976 [FR] France ................................. 76 01297

[51] Int. Cl.² .............................................. B32B 15/04
[52] U.S. Cl. .................................... 428/621; 126/270; 350/1.7; 350/96.12; 428/631; 428/652; 428/680; 428/926
[58] Field of Search ............... 428/630, 631, 629, 621, 428/651, 652, 680, 606, 607, 926, 432, 433, 450, 469; 350/165, 166, 1.4, 1.7; 126/270

[56] References Cited

U.S. PATENT DOCUMENTS

| 2,489,127 | 11/1949 | Forgue | 428/432 |
|---|---|---|---|
| 2,917,817 | 12/1959 | Tabor | 428/913 |
| 2,992,426 | 7/1961 | Borcherdt | 126/270 R |
| 3,006,783 | 10/1961 | Haaijman et al. | 428/433 |
| 3,174,537 | 3/1965 | Meger | 126/270 R |
| 3,176,679 | 4/1965 | Langley | 126/270 R |
| 3,272,986 | 9/1966 | Schmidt | 350/166 |
| 3,516,720 | 6/1970 | Mauer | 350/1 |
| 3,658,582 | 4/1972 | Coker et al. | 428/432 |
| 3,694,337 | 9/1972 | Kushiihashij et al. | 428/433 |
| 3,846,152 | 11/1974 | Franz | 428/433 |
| 3,849,244 | 11/1974 | Groth | 428/432 |
| 3,920,413 | 11/1975 | Lowery | 126/270 R |
| 3,944,440 | 3/1976 | Franz | 148/6.35 |
| 4,011,190 | 3/1977 | Telkes | 252/512 |
| 4,022,947 | 5/1977 | Grubb et al. | 428/433 |
| 4,029,853 | 6/1977 | McMahon et al. | 428/469 |
| 4,048,039 | 9/1977 | Daxinger | 428/450 |

FOREIGN PATENT DOCUMENTS

| 1,286,710 | 1/1969 | Fed. Rep. of Germany | 428/432 |
|---|---|---|---|
| 2,238,941 | 2/1975 | France | 350/1.7 |

OTHER PUBLICATIONS

Cuono, J. J., et al.; *IBM Technical Disclosure Bulletin*, vol. 16, No. 5, pp. 1442 (10/73).
Schmidt, R. N., et al.; "High Temperature Space-Stable Selective Solar Absorber Coatings", *Applied Optics* vol. 4, No. 8 (8/65) pp. 917-925.

*Primary Examiner*—L. Dewayne Rutledge
*Assistant Examiner*—Michael L. Lewis
*Attorney, Agent, or Firm*—Wigman & Cohen

[57] ABSTRACT

This invention relates to space vehicles. It is concerned with solar absorbers consisting of a metallic or metallized substrate with a weak hemispherical emission factor coated with two layers consisting of a semi-transparent metallic layer adhering to the substrate and of an outer interference dielectric layer. The metallic layer is a layer of nickel/chromium alloy consisting of 60 to 83% by weight of nickel and of 40 to 15% by weight of chromium, and the dielectric layer is a layer of silicon monoxide, of zinc sulphide or silicon dioxide.

6 Claims, 3 Drawing Figures

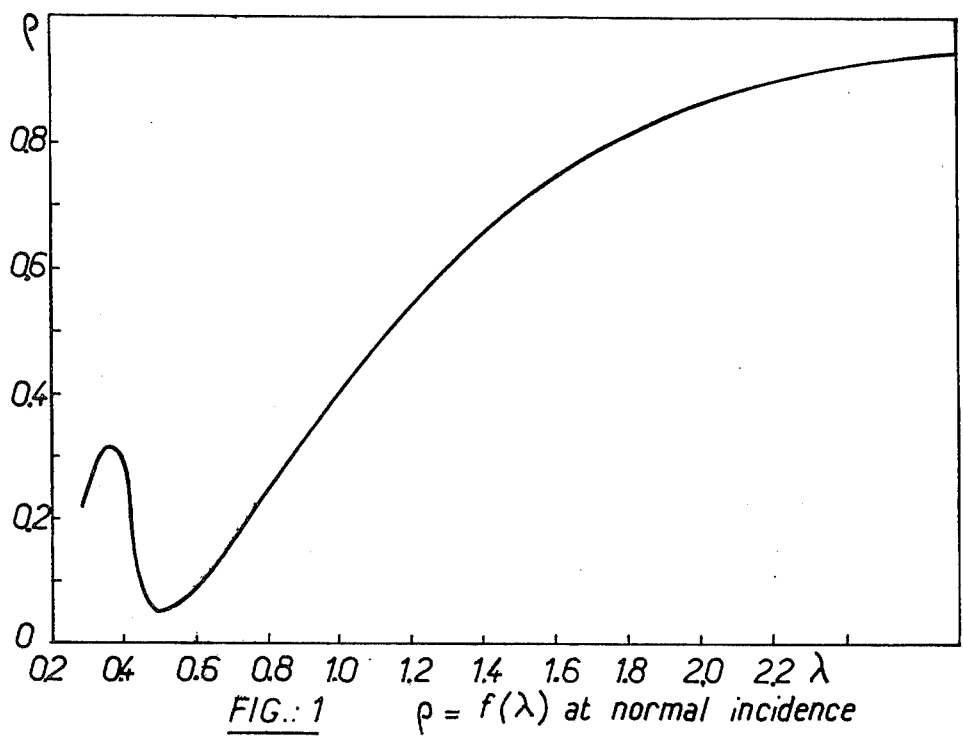
FIG.: 1   $\rho = f(\lambda)$ at normal incidence
FIG.: 2   $\alpha_S = f$ (angle of incidence)
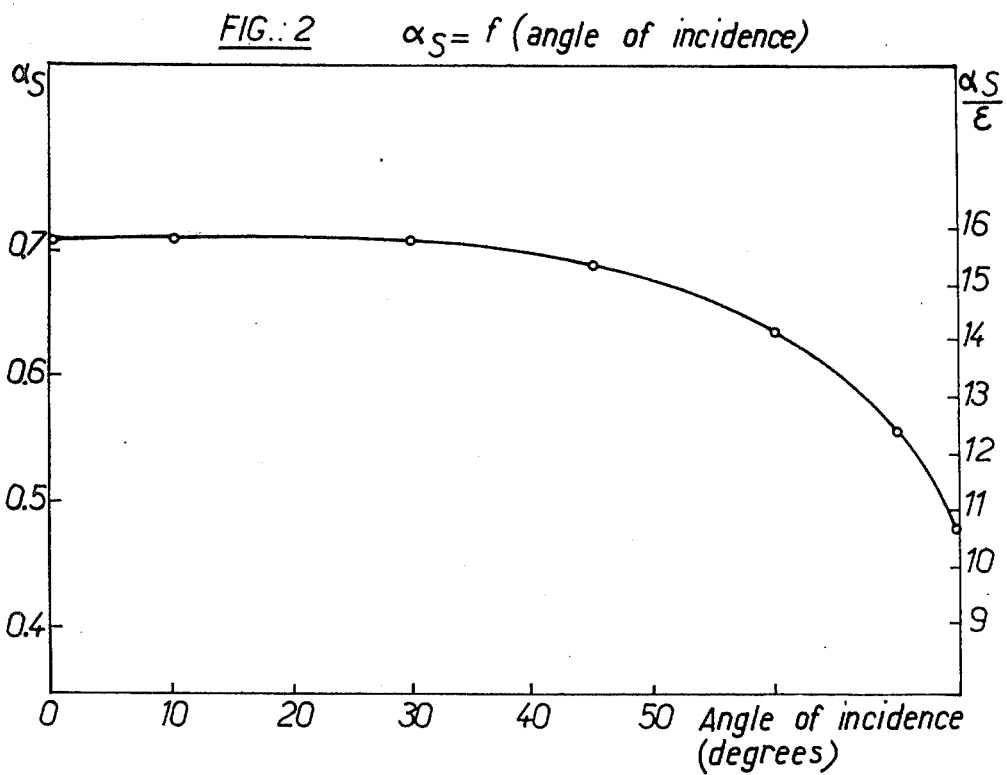
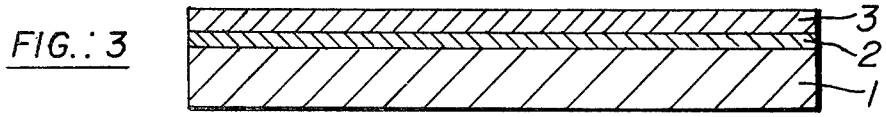
FIG.: 3

SOLAR ABSORBERS WITH LAYERS OF NICKEL/CHROMIUM ALLOY AND DIELECTRIC MATERIAL

BACKGROUND OF THE INVENTION

This invention relates to solar absorbers with layers of nickel/chromium alloy and dielectric material, and is particularly applicable to solar absorbers for use on satellites and space vehicles.

The thermal equilibrium of a satellite or other vehicle travelling in space essentially depends on exchange of radiation with the surrounding environment. The satellite loses energy in the form of radiation and receives it from the sun and the earth (or the nearest planet) in a direct and/or reflected manner.

Thermal control, the role of which is to ensure maintenance of the correct operating temperatures for the various items of equipment contained in the satellite is therefore strongly, sometimes even completely, dependent on the thermo-optical properties of the coatings used (i.e. solar absorption factor $\alpha_s$ and hemispherical emission factor in the infra-red band $\epsilon$). This is why it is of prime importance to have a wide range of coatings available. The coatings commonly used at present can be classified in three categories:

Cold coatings ($\alpha_s/\epsilon < 0.5$) such as white paints ($\alpha_s \simeq 0.20$; $\epsilon \simeq 0.85$), Medium coatings ($\alpha_s/\epsilon \simeq 1$) such as black paints ($\alpha_s \simeq 0.95$; $\epsilon \simeq 0.90$) and aluminium paints ($\alpha_s \simeq 0.30$; $\epsilon \simeq 0.30$), Warm coatings ($\alpha_s/\epsilon > 1.5$) such as polished aluminium ($\alpha_s \simeq 0.10$; $\epsilon \simeq 0.05$) and polished electro-gliding ($\alpha_s \simeq 0.20$; $\epsilon \simeq 0.05$).

In this last category the gilt is the warmest coating that can be provided and it has, for a long time, been desired to have available a "super warm" coating with a high $\alpha_s/\epsilon$ ratio, that is to say having a $\alpha_s/\epsilon$ ratio higher than 10. Such coatings are called "solar absorbers."

Various coatings can enable surfaces with a high $\alpha_s/\epsilon$ ratio to be obtained, as follows:

"Gold-black" coating obtained by the evaporation of gold with the aid of a titanium filament heated under low helium pressure; the coatings obtained have little adhesion and are therefore not utilisable for a space application.

"Nickel-black" coating obtained from the thermal decomposition of nickel carbonyl on a hot substrates; the thermo-optical characteristics obtained are such that $\alpha_s/\epsilon \simeq 6$, which is little better than a conventional bright electro-gilding which is much more stable.

"Electrolytic nickel-black"; the thermo-otpical characteristics obtained are very interesting ($\alpha_s/\epsilon \simeq 17$) but the coating is difficult to reproduce and not very stable in the space environment.

Copper oxide coating obtained by the oxidation in air or in solution of an electrolytic deposit of copper; this type of coating is stable but the thermo-optical characteristics are insufficient ($\alpha_s/\epsilon \simeq 8-9$).

Deposits on polished metallic substrates of alternated metallic and dielectric interference layers; ratios $\alpha_s/\epsilon$ above 15 have been obtained by this method. Thus, Schmitt and Park, "Applied Optics," Vol. 4, No. 8. August 1965, pages 917–925, suggests multiple layers of magnesium fluoride, cerium oxide, aluminium and and molybdenum oxide. Certain of these deposits lead to $\alpha_s/\epsilon$ ratios superior to 10 and are stable with respect to ultra violet rays, vacuum and elevated temperatures.

The coatings described by Schmitt and Park, however, have the inconvenience of requiring the depositing of multiple layers, which makes their manufacture long and relatively expensive.

It emerges from the preceding discussion that the use of interference layers is the most satisfactory means of obtaining solar absorbers of a quality suitable for space.

OBJECTS AND SUMMARY OF THE INVENTION

The object of the invention is the provision of new solar absorbers featuring a heightened $\alpha_s/\epsilon$ ratio particularly applicable for space usages which are easy to manufacture and relatively cheap.

According to the invention, there is provided a solar absorber comprising a metallic substrate or metallised substrate with a weak hemispherical emission factor coated with a semi-transparent metallic layer adhering to the substrate and an outer interference dielectric layer, the metallic layer being a nickel/chromium alloy layer consisting of 60 to 85% by weight of nickel and of 40 to 15% by weight of chromium and the dielectric layer being a layer of silicon monoxide, zinc sulphide or silicon dioxide.

According to a preferred manufacturing method, the nickel/chromium alloy contains about 80% by weight of nickel and about 20% by weight of chromium and the dielectric layer is a layer of silicon monoxide.

The substrate can consist, for example, of various polished metals (aluminium, gold) or of suitably metallised plastics material. At present, a substrate of polished aluminium is preferred because of the good adhesion of the nickel/chromium alloy layer to the aluminium and the low cost of aluminium.

BRIEF DESCRIPTION OF THE DRAWINGS

Embodiments of the invention will now be described, by way of example, with reference to the accompanying drawings, in which:

FIG. 1 is a graph showing the variation of the monochromatic reflection factor $\rho$ as a function of the wave length $\lambda$, at normal incidence, for a preferred solar absorber in accordance with the invention, consisting of a polished aluminium substrate coated with a coat of nickel/chromium alloy of a thickness of 150 Å and with a layer of silica monoxide of a thickness of 650 Å.

FIG. 2 is a graph showing the variation of the solar absorption factor $\alpha_s$ as a function of the angle of incidence, for the preferred solar absorber described above, and FIG. 3 is a cross-sectional view of a solar absorber according to the present invention.

DETAILED DESCRIPTION OF THE PREFERRED EMBODIMENTS

As is known, to obtain a coating presenting a $\alpha_s/\epsilon$ ratio of a high degree it is necessary for:

the solar absorption factor $\alpha_s$ to be as high as possible or, what amounts to the same thing, for the solar reflection factor $\rho_s$ to be as weak as possible; and the hemispherical emission factor $\epsilon$ to be as weak as possible.

This can be achieved by depositing, on a substrate with a weak $\epsilon$ (for example polished aluminium), a series of interference layers which provides a wide absorption band centered on 4800 Å (the wave length corresponding to the distribution of solar energy beyond the atmosphere).

It will be recalled that the monochromatic reflection factor $\rho\lambda$ for normal incidence on the separation surface of two media with a refractive index of $n_o$ is given by the following equation:

$$\rho\lambda = \left(\frac{n_1 - n_o}{n_1 + n_o}\right)^2$$

This reflection factor $\rho\lambda$ can be reduced if a material with a refractive index of $n_i$ between $n_o$ and $n_1$ is interposed between the two media.

Furthermore, it is possible, by a judicious choice of thicknesses, to establish destructive interference between the wave lengths reflected on the various interfaces.

This is achieved if the dephasing factor $\phi$ is such that:

$$\phi = k\delta = (2m + 1)(\pi/2)$$

where:
$k$ = wave number = $2/$
$\delta$ = path difference = $n_i e$
$m$ = 0,1,2,3, etc.
$e \approx$ thickness then:

$$(2\pi/\lambda)\, n_i e = (2m + 1)(\pi/2)$$

and:

$$e = \lambda/4n_i \quad \text{for } m = 0$$

For a single layer with a refractive index $n_i$ and a thickness $e$ of:

$$e = \lambda/4n_i,$$

there is obtained:

$$\rho\lambda = \left(\frac{n_o n_1 - n_i^2}{n_o n_1 + n_i^2}\right)^2$$

Extinction will be complete for $n_i = \sqrt{n_o n_1}$

For two layers with refractive indices $n_i$ and $n_i'$ and thicknesses $e = \lambda/4n_i$ and $e' = \lambda/4n_i'$, there is obtained:

$$\rho\lambda = \left(\frac{n_i^2 n_1 - n_i'^2 n_o}{n_i^2 n_1 + n_i'^2 n_o}\right)^2$$

Extinction will be complete for $n_i^2 n_1 = n_i'^2 n_o$.

For any angle of incidence, the dephasing factor can be represented by:

$$\phi_{(\theta)} = \frac{\phi_{(0)}}{\sqrt{1 - \sin^2(\theta)/n^2}}$$

Thus, an interference layer calculated for a normal incidence will be badly adjusted for another angle of incidence. The phenomenon will be all the more noticeable if the angle of incidence is large and the refractive index is weak.

In accordance with the present invention, excellent solar absorbers can be obtained by depositing on a substrate 1 with a weak hemispherical emission factor $\epsilon$, preferably a substrate of polished aluminium, a semi-transparent layer 2 of an appropriate nickel/chromium alloy and an interference layer 3 of an appropriate dielectrical material selected from amongst SiO, ZnS and SiO$_2$, as shown in FIG. 3. The nickel/chromium alloy can contain from 60 to 85% by weight of nickel and 40 to 15% by weight of chromium, but preferably consists of about 80% nickel and about 20% of chromium.

The alloy layer and the dielectric layer can be deposited in the required order on the metallic or metallised substrate having a weak emission factor $\epsilon$ by the well known technique of evaporation under vacuum with control of the deposited layers, for example by means of piezoelectric quartz.

The following non-restrictive example is given as an illustration of the invention.

EXAMPLE

A layer of nickel/chromium alloy (80/20 by weight), with a thickness of 150 Å, is deposited by evaporation under reduced pressure on to a rectangular substrate (50 × 50 × 0.5 mm) of polished aluminium ($\epsilon \approx 0.04$). This alloy layer gives an excellent adhesion to the polished aluminium substrate. The solar reflection factor $\rho_s$ of the assembly obtained is 0.60 as compared to 0.85 for polished aluminium, whilst the emission factor in the infrared band is not affected ($\epsilon$ remains in the vicinity of 0.04).

Next, a layer of silicon monoxide is deposited under reduced pressure on to the substrate coated with the Ni/Cr alloy. Silicon monoxide has the advantages of adhering well to the Ni/Cr alloy and of possessing a refractive index which is sufficiently high ($n = 1.8$) to permit the deposition of a relatively thin layer and render the variation of dephasing factor with the angle of incidence less important.

The thickness $e$ of the layer of deposited SiO has been calculated for an absorption band centered on the wave length of 4800 Å, where $$e = \frac{\lambda}{4n} = \frac{4800}{4 \times 1.8} = 650 \text{ Å}$$

The solar absorber thus prepared presents a brilliant appearance. It is magenta coloured and is homogenous and uniform. The adhesion of the layers to the polished aluminium substrate is excellent (strip adhesion test). Its thermo-optical characteristics are as follows:

$\alpha_s = 0.70 \pm 0.02$
$\epsilon = 0.045 \pm 0.01$
$\alpha_s/\epsilon = 15 \pm 3$ The variation of the monochromatic reflection factor $\rho$ has also been measured as a function of the wave length $\lambda$ at normal incidence, as well as the variation of the solar absorption factor $\alpha_s$ as a function of the angle of incidence. The solar absorber of this example also has a remarkable uniformity of properties over its entire surface ($\Delta\alpha_s < 0.01$ and $\Delta\epsilon < 0.01$). Also its manufacture offers good reproducability $$(\Delta\alpha_s < 0.05, \Delta\frac{\alpha_s}{\epsilon} < 2)$$

which makes it suitable for industrial production.

It is to be noted that even though a specific thickness of 150 Å has been used for the Ni/Cr alloy layer in the above example, this can be deviated from and a thickness lying between about 100 and 200 Å can be used, 150 Å being mere preference.

In the same way, the thickness of the SiO layer can deviate slightly from 650 Å, a tolerance of ±15 Å being permissible.

In the event it is desired to replace the SiO layer by a layer of ZnS or of $SiO_2$ the thickness of the layer can be easily calculated by the formula: $e = \lambda/4n$ knowing that the refractive indices of ZnS and $SiO_2$ are equal to about 2.3 and 1.46 respectively.

The solar absorber described in the above example has been submitted to various tests in order to verify its stability and its suitability for use in a space medium. These tests and the results obtained are shown in the following:

(a) Resistance to Laboratory Storage

Conditions: 1500 hours at ambient temperature in laboratory environment.
Result: no modification of initial characteristics.

(b) Resistance to Humid Heat

Conditions: 7 days at 50° C with a relative humidity above 90%.
Result: appearance of some iridescence on the edges of the absorber, no other modification of the initial characteristics.

(c) Resistance to Thermal Cycling Under Vacuum

Conditions: 200 thermal cycles between −50° C and +100° C under a vacuum better than $10^{-6}$ torr,
Result: same result as preceding.

(d) Resistance to Cumulative Tests of Humid Heat and Thermal Cycles Under Vacuum Conditions: same conditions as those of test (b) and (c) above,
Result: same result as preceding.

(e) Resistance to UV Radiation Under Vacuum

Conditions: 711 hours (1 sun UV)
Result: no modification of initial characteristics.

(f) Resistance to Specific Radiation

Conditions:
Electrons Flow: $10^{10} e^-/cm^2/s$
    first dosage: $10^{13} e^-/cm^2$
    second dosage: $5.10^{13} e^-/cm^2$
Protons Dosage $10^{12}$ $p^+/cm^2$ or a flow of $10^9$ $p^+/cm^2/s$
Result: no modification of initial characteristics.

COMPARATIVE TEST A

This comparative test has been carried out in order to determine if provision of a plurality of pairs of alternate layers of NiCr and SiO has an advantage over a single pair of layers as in the above example. For this test, two supplementary solar absorbers were prepared, the one consisting of four deposited layers (NiCr - SiO - NiCr - SiO) and the other of six deposited layers (NiCr - SiO - NiCr - SiO - NiCr - SiO), each of the deposited layers of NiCr and SiO being identical to those deposited in the above example and the substrate consisting of polished aluminium as before. Measurements were taken of the emission factor in the infra-red band $\epsilon$ of these solar absorbers and it was discovered that the solar absorber with four layers presented an $\epsilon$ equal to about 0.08 and that the solar absorber with six layers presented an $\epsilon$ equal to about 0.14, whereas the solar absorber with two layers of the example presents an $\epsilon$ of the order of 0.045.

Therefore, increasing the number of layers entails a noticeable increase in $\epsilon$ which is not compensated by an increase of the solar absorption factor. Consequently, the manufacture of solar absorbers with more than two deposited layers is of no practical interest.

What is claimed is:

1. A solar absorber for collecting solar energy comprising, a metallic or metallized substrate having a weak hemispherical emission factor in the infra-red range, a semi-transparent metallic layer adhering to the substrate, and an outer dielectric interference layer adhering to said semi-transparent layer to form a composite structure, the metallic layer being a layer of nickel/chromium alloy consisting of 60 to 85% by weight of nickel and of 40 to 15% by weight of chromium, and the dielectric layer being a layer of a material selected from the group comprising silicon monoxide, zinc sulphide and silicon dioxide, said solar absorber composite structure having a solar absorption factor/hemispherical emission ratio greater than 10.

2. A solar absorber according to claim 1, wherein the nickel/chromium alloy contains about 80% by weight of nickel and about 20% by weight of chromium and the dielectric layer is a layer of silicon monoxide.

3. A solar absorber according to claim 1, wherein the substrate is of polished aluminium.

4. A solar absorber according to claim 2, wherein the thickness of the NiCr alloy layer is between 100 to 200 Å, and the thickness of the SiO layer is 650 Å ± 15 Å.

5. A solar absorber according to claim 4, wherein the thickness of the NiCr alloy layer is about 150 Å and the thickness of the SiO layer is about 650 Å.

6. A solar absorber according to claim 1, having a solar absorption/hemispherical emission ratio of about 15.

* * * * *